March 3, 1942.   T. L. HEDGPETH   2,274,923
BAND SAW
Filed Feb. 27, 1939   6 Sheets-Sheet 1

Inventor:
Theron L. Hedgpeth
By Williams, Bradbury, McCaleb & Hinkle
Attys.

March 3, 1942. T. L. HEDGPETH 2,274,923
BAND SAW
Filed Feb. 27, 1939 6 Sheets-Sheet 2

March 3, 1942.   T. L. HEDGPETH   2,274,923
BAND SAW
Filed Feb. 27, 1939   6 Sheets-Sheet 3

Inventor.
Theron L. Hedgpeth
By Williams, Bradbury,
McCaleb & Hinkle
Attys.

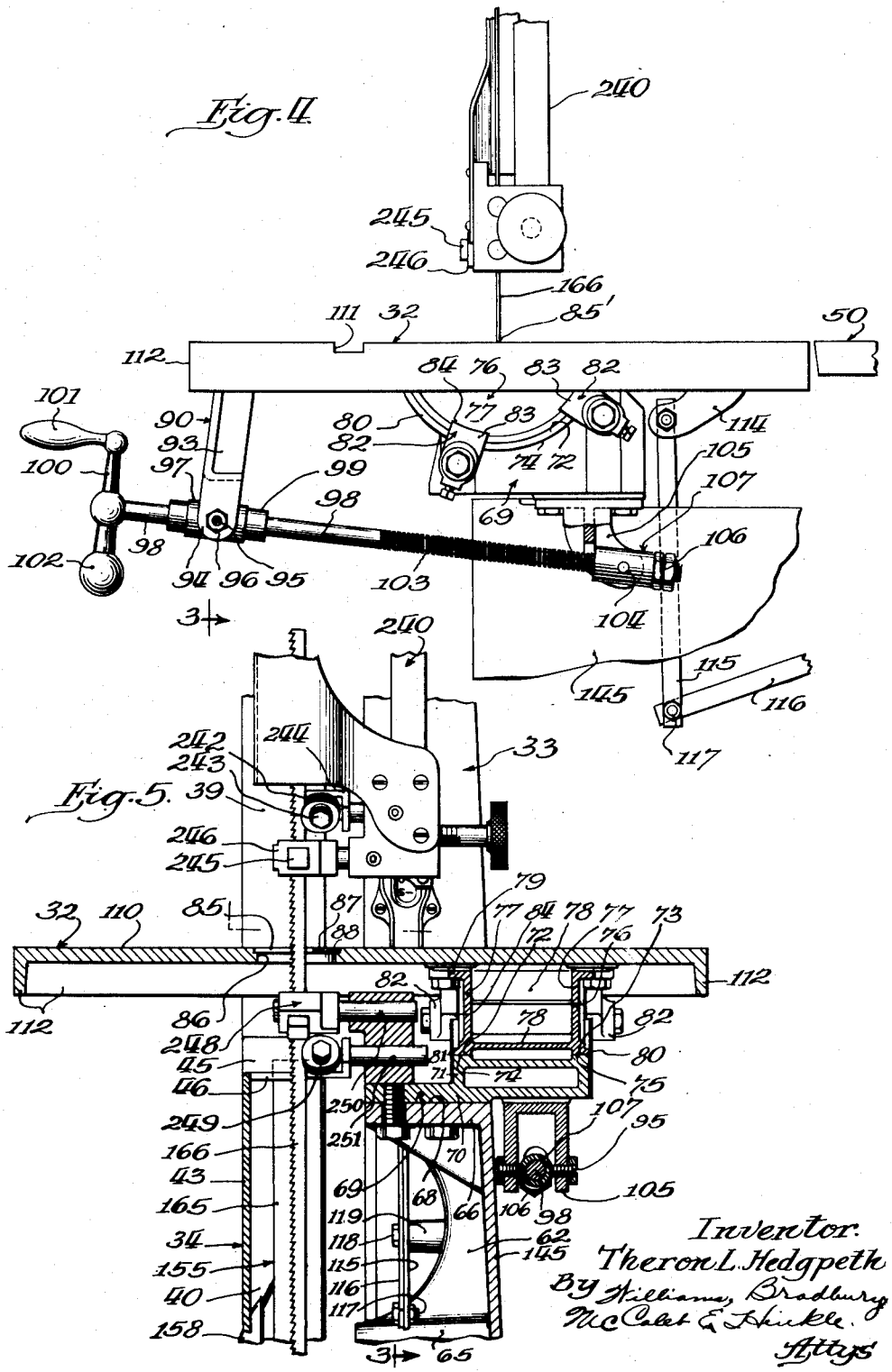

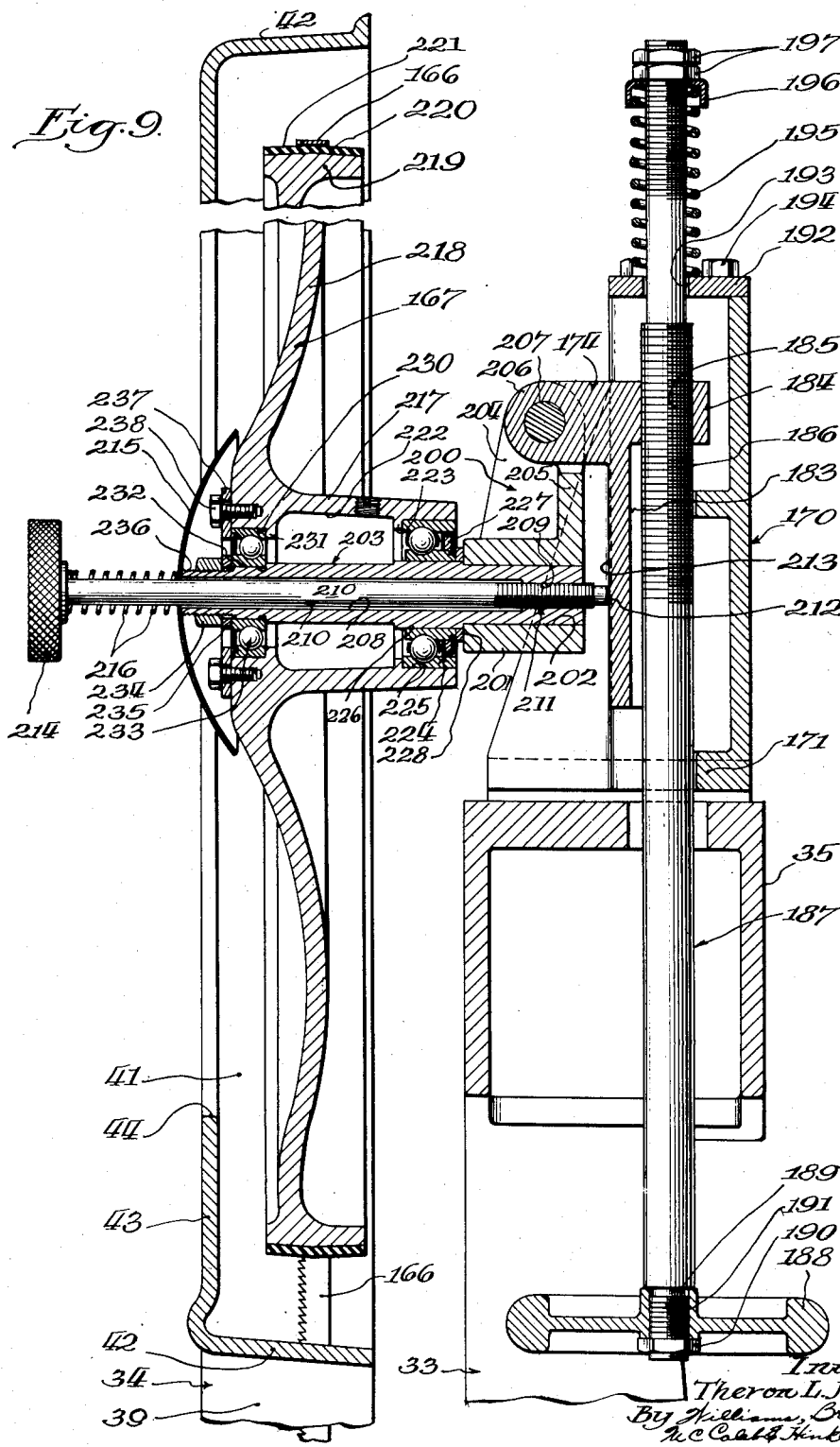

March 3, 1942. T. L. HEDGPETH 2,274,923
BAND SAW
Filed Feb. 27, 1939 6 Sheets-Sheet 6

Inventor:
Theron L. Hedgpeth
By Williams, Bradbury,
McCabe & Hickle
Attys.

Patented Mar. 3, 1942

2,274,923

UNITED STATES PATENT OFFICE 2,274,923

BAND SAW

Theron L. Hedgpeth, Oak Park, Ill., assignor to Duro Metal Products Company, Chicago, Ill., a corporation of Illinois Application February 27, 1939, Serial No. 258,669

8 Claims. (Cl. 143—31)

The present invention relates to wood working tools, and is particularly concerned with improvements in band saws.

One of the objects of the invention is the provision of an improved band saw structure which is adapted to facilitate the adjustment of the tilt of the upper pulley axis from the front of the machine so that this adjustment can be made while the machine is in operation.

When a piece of work is being backed off the blade, there is a tendency to pull the blade sidewise, and it is very important at this time to be able to effect an adjustment of the tilt of the upper pulley axis. Such an adjustment may cause the upper pulley to tilt back, at its top, so that the pulley crown will cause the blade to ride back tightly against its guide roller, which lies adjacent the work, and which engages the rear side of the blade. The machines of the prior art of which I am aware are not so constructed that this adjustment may be accomplished while a machine is operating, because they require the operator to go back of the machine to adjust the tilt of the upper pulley axis.

Another object of the invention is the provision of an improved band saw structure, including means for effecting an adjustment of the upper pulley tilt and means for guarding the hand of the operator from the mechanism when an adjustment is effected with the machine in operation.

Another object of the invention is the provision of an improved band saw structure, including a tiltable table and an angularity indicator located on the standard in such a position that the angularity of the table is in position to be observed by the operator at all times and is accurately indicated on the standard.

Another object of the invention is the provision of an improved adjusting means for the angularity of tilt of the upper pulley axis, which is effective exactly at the center of the upper pulley by means of the provision of a hollow pulley shaft in which the adjusting means is located.

Other objects and advantages of the invention will be apparent from the following description and the accompanying drawings, in which similar characters of reference indicate similar parts throughout the several views.

Referring to the six sheets of drawings accompanying this specification,

Fig. 4 is a fragmentary elevational view of the same structure as Fig. 3, taken from the rear side of Fig. 1;

Fig. 5 is a fragmentary vertical sectional view, taken on the plane of the line 5—5 of Fig. 3, looking in the direction of the arrows, showing further details of structure of the table and its adjustable supporting devices;

Fig. 6 is a fragmentary horizontal sectional view, taken through the standard and angularity indicator, on the plane of the line 6—6 of Fig. 2, looking in the direction of the arrows;

Fig. 7 is a fragmentary horizontal sectional view, taken on the plane of the line 7—7 of Fig. 2, showing further details of structure of the angularity indicator;

Fig. 8 is a fragmentary vertical sectional view, taken on the plane of the line 8—8 of Fig. 2, showing further details of the structure of the angularity indicator;

Fig. 9 is a fragmentary vertical sectional view, taken on the same plane as Fig. 2, showing the details of structure of the upper band saw pulley and its means for effecting an adjustment of the pulley axis;

Figure 2:
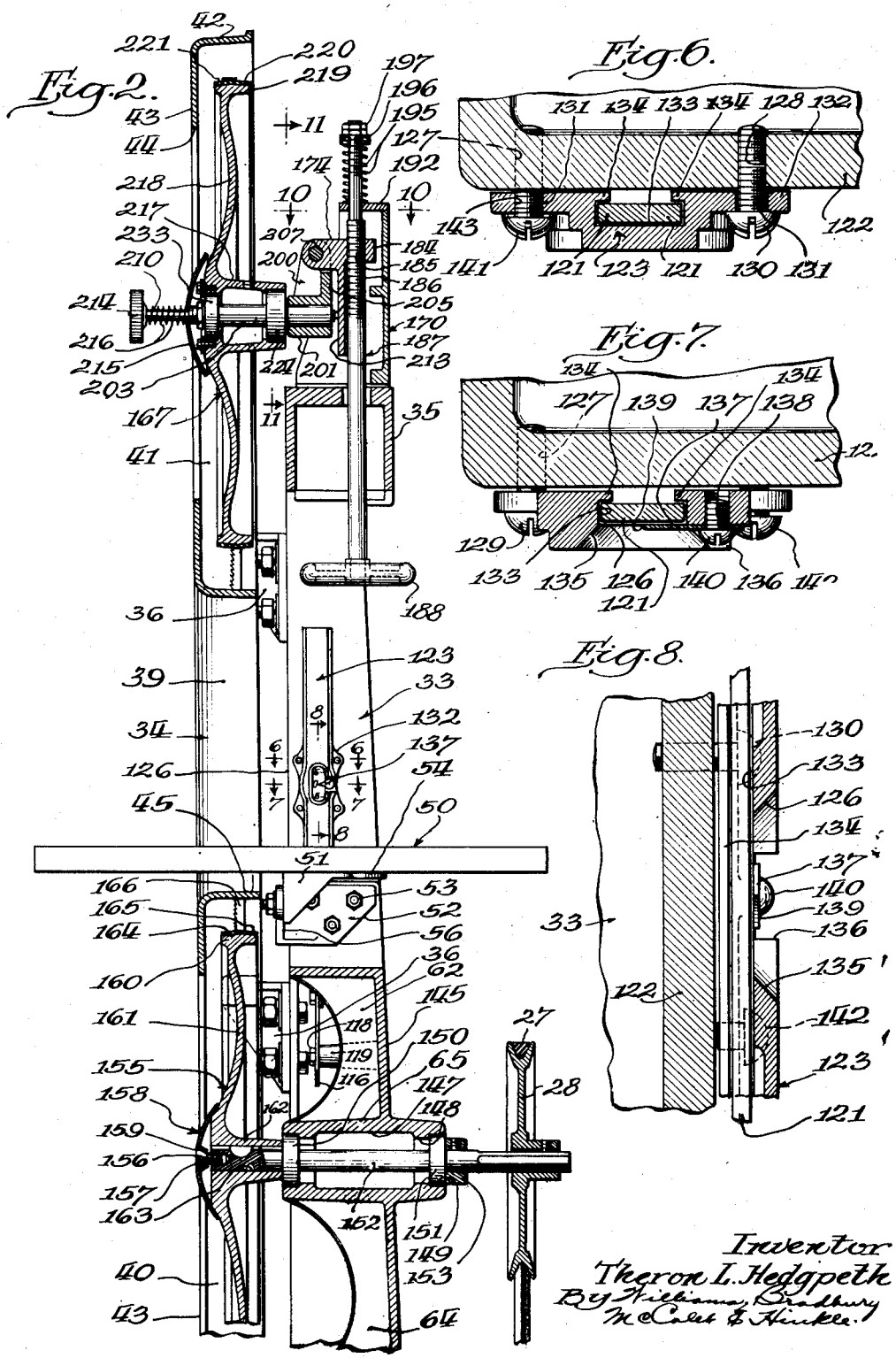
Fig. 2 is a fragmentary vertical sectional view, taken on the plane of the line 2—2 of Fig. 1, looking in the direction of the arrows, showing the details of structure of support of the two pulleys of the band saw and showing the angularity indicator.
Figure 10:
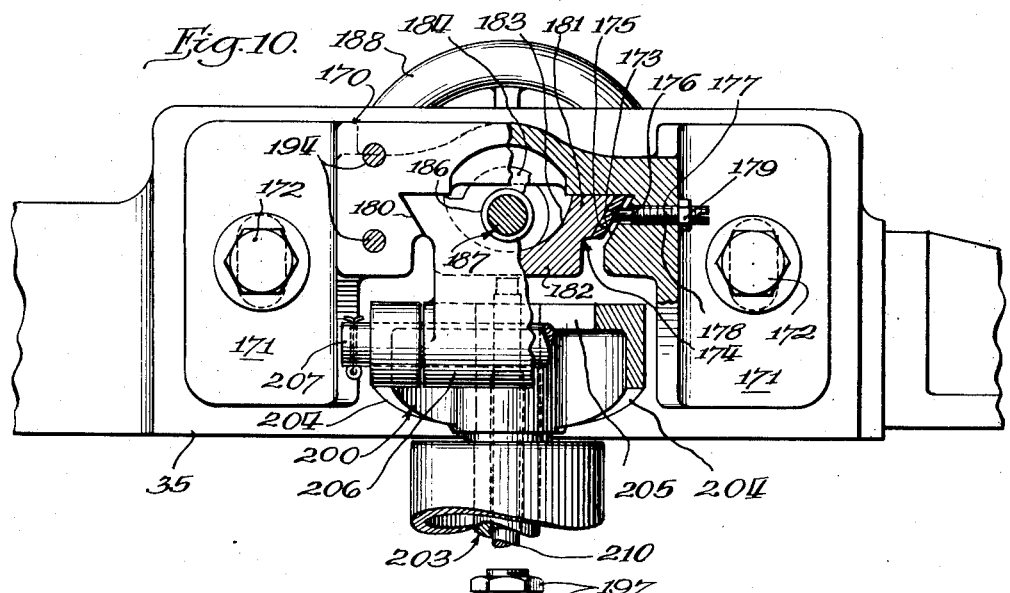
Figure 11:
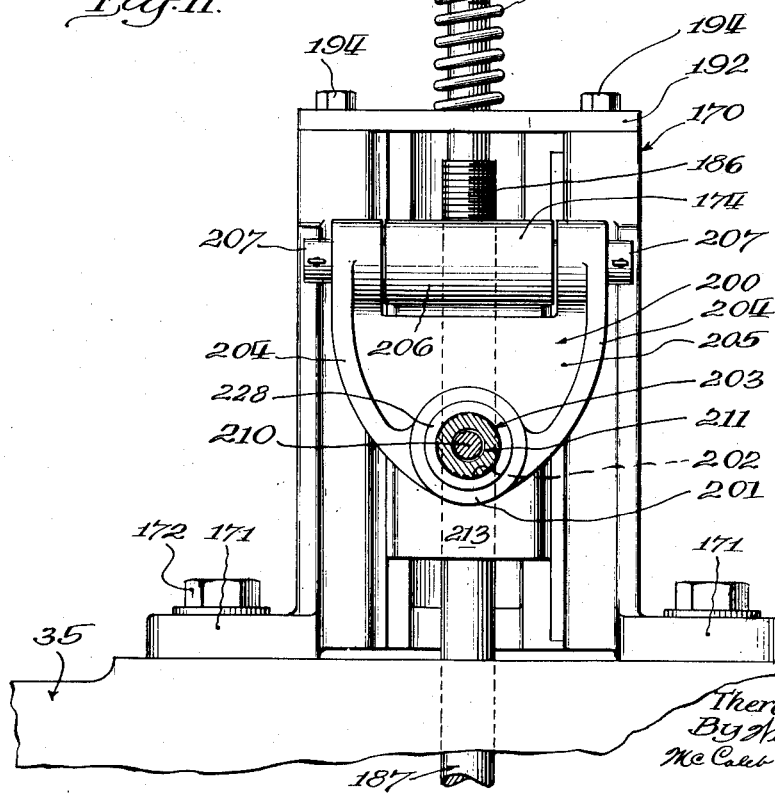

Fig. 10 is a fragmentary horizontal sectional view, taken on the plane of the line 10—10 of Fig. 2, looking in the direction of the arrows, showing the details of structure of the slide and guides for supporting the upper pulley shaft and permitting an adjustment of the tightness of the band saw; and Fig. 11 is a fragmentary vertical sectional view, taken on the plane of the line 11—11 of Fig. 2, looking in the direction of the arrows.

Figure 1:
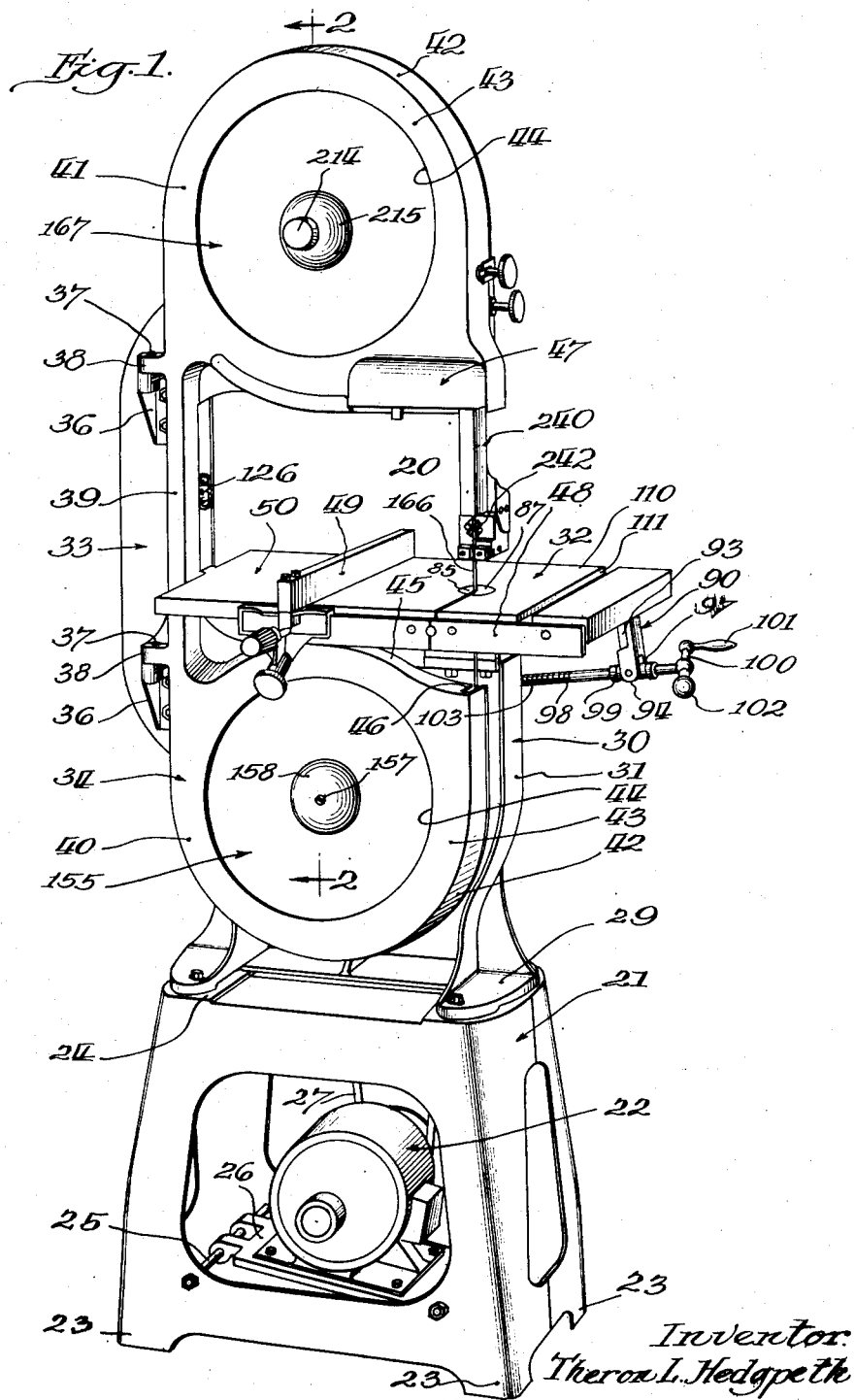
Fig. 1 is a front view in perspective of a band saw embodying my invention.

Referring to Figs. 1 and 2, the band saws 20 constructed according to the invention are preferably mounted on a base 21, which may support the motor 22. The base 21 may comprise a pair of castings, each casting being formed with a pair of feet 23, and with a top flange 24 for supporting the band saw.

The castings of the base 21 may be secured together by a plurality of transverse tie bolts 25, one of which is utilized for pivotally supporting a motor stand 26, to which the motor 22 is bolted. The weight of the motor 22 may thus be utilized for maintaining a tight condition of the drive belt 27, which extends about the motor pulley and the drive pulley 28 (Fig. 2) of the band saw.

The band saw 20 preferably comprises a vertical cast metal frame, provided at its bottom with feet 29, serving as attaching flanges, by means of which the band saw is secured by bolts to the base 21.

The band saw frame 30 has an upwardly extending frame member 31 at the right side for supporting the table 32. It also has an upwardly extending frame member or standard 33 at the left side, viewing the machine from the front, as seen in Fig. 1, for supporting the pivotally mounted saw guard 34 and for carrying the over-hanging arm 35, which supports the upper band saw pulley.

The standard 33 is provided with a pair of pintle brackets 36, which may be bolted or otherwise secured thereto, and which are provided with upwardly projecting pintles 37 engaged in apertures in the pintle lugs 38, which project laterally from the saw guard 34.

The saw guard 34 comprises a connecting frame member 39 and a pair of guard housings 40, 41, each of which has a cylindrical boundary wall 42 and a radially inwardly extending wall 43. These two walls enclose the surface of the pulleys and the band saw at the periphery of the pulleys, and the guard is provided with enlarged apertures 44, exposing the major portion of the surface of the pulley inward of the periphery of the pulley.

The guard may also have a wall 45 adjoining the cylindrical walls 42 for the purpose of strengthening the guard, and the wall 45 has a slot 46 in each case for passing the band saw.

The upper guard housing 43 may be provided with an integral, downwardly open socket 47 for receiving a work light.

The edge of the table 32 carries a guide bar 48, upon which a work fence 49 is slidably supported, and the work fence may be substantially as shown in my prior Patent No. 2,075,282 on Bench saw, issued March 20, 1937.

Figure 3:
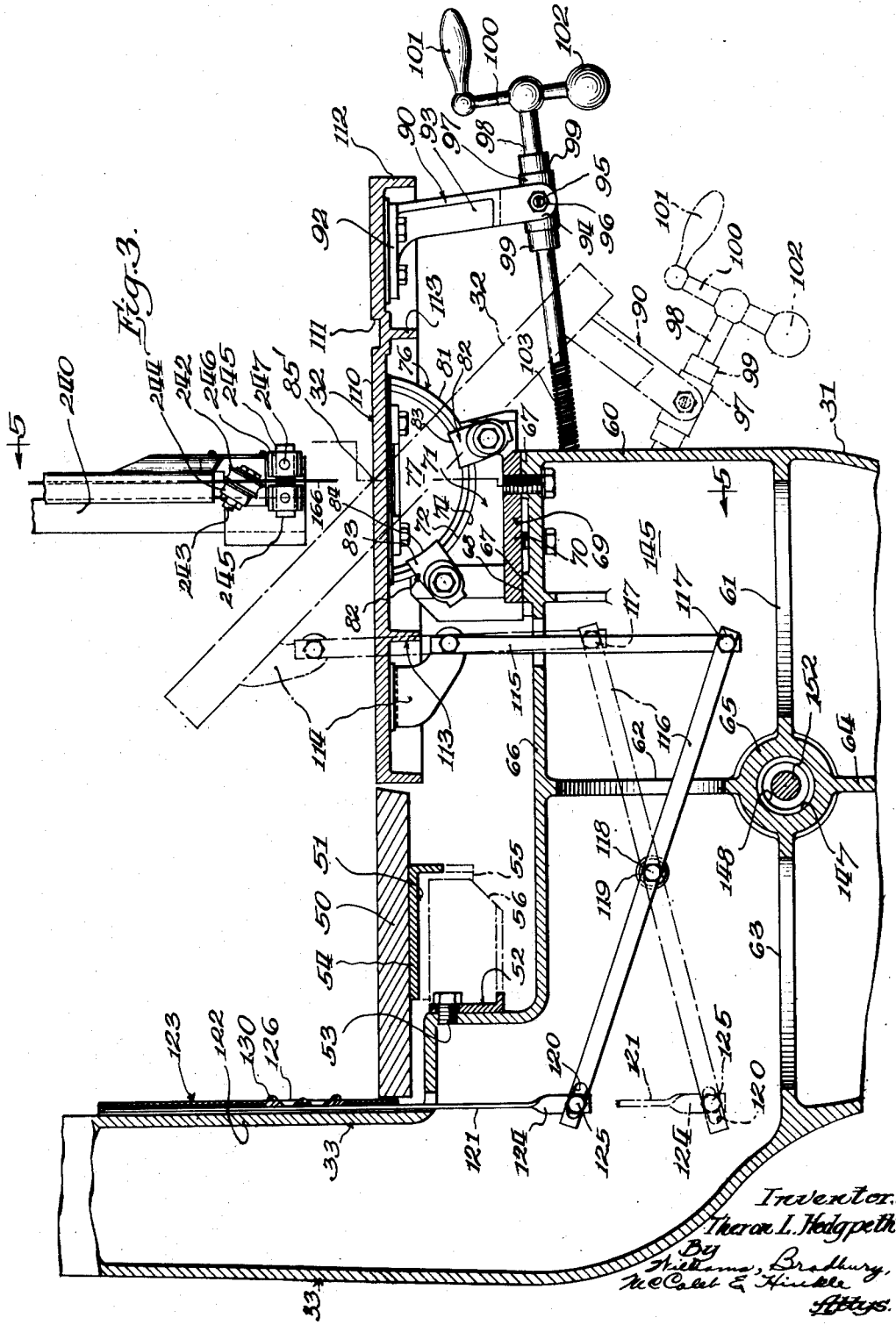
Fig. 3 is a fragmentary vertical sectional view, taken through that portion of the band saw located adjacent the table top, showing the details of structure of the pivotally supported table and the angularity indicator, taken on the plane of the line 3—3 of Fig. 5.

In addition to the tiltable table 22 the standard 33 may support a wooden table section 50, comprising a plane, rectangular wooden table top, which may be secured to the standard as shown in Fig. 3. A pair of right angle brackets 51 and 52 may be employed. The bracket 52 has one vertical flange secured by a screw bolt 53 to the standard 33. The bracket 51 has its horizontal flange 54 secured by wood screws or other suitable fastening means to the wooden table section 50. Both brackets 51, 52 have vertical flanges 55, 56, which may be secured together by bolts or other suitable fastening devices, the bolts having suitable clearance in their apertures so as to provide for a small amount of adjustment in the wooden table section 50.

The band saw frame 30 has its table-supporting portion 31 provided with a plurality of reinforcing flanges 60, 61, 62, 63, 64 extending horizontally and vertically and integrally connected to a bearing-supporting hub 65. The flanges 60 and 62 are integrally secured to a top flange 66, which is provided with a pair of upwardly extending rib formations 67, which may be machined at their upper plane surfaces 68 for engagement with a table-supporting bracket 69.

The table-supporting bracket 69 comprises a substantially flat lower body 70 and has an upwardly projecting body 71, which is formed (Fig. 5) with a pair of substantially semicylindrical bearing surfaces 72, 73 located in spaced relation to each other and adapted to engage complementary cylindrical trunnion surfaces 74, 75 on a trunnion member 76 carried by the table top.

The trunnion member 76 comprises a cast metal member having the side walls 77 joined by flanges 78 and provided with the foot flanges 79, by means of which the bolts may secure the trunnion fixture to the lower side of the table top.

The side walls 77 support the substantially cylindrical trunnion surfaces 74, 75, and adjacent each bearing surface the trunnion fixture 76 is provided with a laterally projecting retaining flange 80, 81. This retaining flange is adapted to be engaged on its upper side in each case by a bracket 82, which is carried by the table-supporting bracket 69. A plurality of the brackets 82 are preferably used on each side of the table bracket 69, as shown in Fig. 3, and each of the retaining brackets 82 has an attachment flange 83 for receiving a bolt, which passes through an aperture in the bracket 82 and is threaded into a bore in the bracket 69.

Each retaining bracket 82 also has laterally projecting retaining flange 84 of substantially cylindrical shape and curved on the same center as the surfaces 72 and 74 so that the cylindrical flange 84 may engage on the upper side of the laterally projecting flanges 80 or 81 and hold the cylindrical surfaces 72, 74 and 73, 75 respectively, in sliding engagement with each other.

Thus the table 32 is mounted for pivotal movement upon an axis which is located at the center of generation of the cylindrical surfaces 72–75. This center is preferably located in the plane of the top of the table 32 at the point 85', where the band saw passes through a slot 85 in the table 32.

The table 32 may be provided with an enlarged cylindrical aperture 86, and a pressure plate 87, having a suitable slot 85, may be pressed into a counterbore 88 above the bore 86.

The table is preferably provided with a crank shaft bearing bracket 90, which has an attachment flange 92 secured by bolts to the under side of the table 32 and has a diagonally and downwardly extending arm 93, which is formed with a pair of spaced bearing flanges 94.

The spaced bearing flanges are provided with threaded apertures for receiving a pair of conically pointed set screws 95, which are locked in place by lock nuts 96 and which engage in complementary apertures oppositely disposed on the sides of a bearing member 97.

The bearing member 97 has an axially extending bore for rotatably receiving the crank shaft 98, and thrust bearings 99 are secured on the shaft 98 at each end of the bearing 97 by means of pins or other suitable securing devices, which secure the thrust bearings fixedly to the shaft 98. At one end the shaft 98 carries a conventional crank arm 100 provided with a handle 101 and counter-weight 102. At the other end the shaft 98 is provided with relatively coarse screw threads 103, which engage in a complementarily threaded bore in a cylindrical screw follower 107, which is pivotally mounted by means of set screws 104 in a bracket 105 fixedly carried by the frame of the band saw.

A pair of lock nuts 106 on the extreme threaded end of the shaft 98 act as a stop member for limiting the outward movement of the shaft 98. The table 32 is thus adapted to be tilted by rotating crank 100 with the handle 101, and is also adapted to be held in any predetermined position to which it is moved because of the non-reversible characteristics of the screw 103 and the follower 107.

The table 32 comprises a cast metal member, having an upper plane surface 110, which is provided with one or more slots 111 for receiving a complementary bar which carries a mitre gauge. The table 32 also has an depending border flange 112 and a plurality of transverse reinforcing ribs 113.

In order to indicate the angularlity of the table at all times, the table 32 is provided with a bracket 114 secured to its lower side adjacent the left edge of the table (Fig. 3), and the bracket 114 is pivotally connected to a connecting link 115 by means of a screw bolt passing through an aperture in the bracket and link, and provided with a nut.

The link 115 is pivotally connected in a similar way to the right end of a lever 116 by means of a bolt 117. The lever 116 is pivotally mounted adjacent its middle by means of the bolt 118, which is fixedly secured in a threaded bore in the hub member 119 on the frame 60, and the lever 116 is provided with an elongated slot 120 at its left end (Fig. 3).

An indicator bar 121 is slidably mounted between the front wall 122 of the standard and an elongated guide member 123 (Fig. 2), and the indicator bar 121 has a ninety degree twist at 124 so that its lower end is parallel to the flat sides of the lever 116.

The indicator bar 121 is pivotally and slidably secured to the lever 116 by means of a screw bolt and nut, the bolt 125 passing through a cylindrical aperture in the indicator bar 121 and through the slot 120 in the lever 116.

The indicator bar 121 has its face provided with suitable indicia, comprising transverse scale division marks, which may be in the form of grooves and located at regularly spaced intervals, and numerical indicia, comprising a zero and scale division numbers, such as 5, 10, 15, etc., for indicating the degrees of tilt. The scale division numbers preferably extend oppositely in two directions, that is, upward and downward from the zero point, as shown in Fig. 1, and are suitably located so that they are visible at a window aperture 126 in the guide member 123.

The forward wall 122 of the standard 33 is provided with threaded bores 127, 128 to receive the screw bolts 129, 130, (Figs. 6 to 8) which extend through bores 131 in the guide member 123 at diagonally opposite corners of the guide member.

The guide member 123 comprises a cast metal member, which is formed with laterally projecting attachment flanges 132 and with a central body having a longitudinally extending groove 133 in the rear side thereof. The groove 133 is overhung by inwardly projecting flanges 134 at each side at the rear, and is thus provided with a substantially rectangular groove 133 for receiving the indicator bar 121, which is slidably mounted in the guide member 123.

The groove 133 communicates with the window aperture 126 (Fig. 7), which is preferably outwardly beveled at 135 so as to provide a maximum visibility.

The front surface of the guide member 123 is provided with a groove 136 in one side for receiving the pointer 137, which may consist of a sheet metal member provided with an aperture 138 and a point 139. The point 139 projects laterally into the window aperture 126, and is located immediately in front of the indicia on the indicator bar 121. A single screw bolt 140, threaded into the guide member 123 and passing through the aperture 128, secures the pointer 137 and permits a slight pivotal adjustment of the pointer so that the pointer may be caused to indicate accurately the angular tilt of the table, and particularly the zero or level position, to which the table and pointer are adjusted.

In order to prevent the binding of the indicator bar 121 in the guide member 123 and to permit a certain amount of tolerance in the manufacture of the cast metal parts, guide member 123 is adjustably mounted on the standard 33. This is done by means of two additional screw bolts 141, 142 located in threaded bores 143 in the guide member 123 at the other two diagonally opposite corners thereof.

As the screw bolts 141, 142 are relatively short, their ends are not threaded into the standard, but bear against the face of the standard. The screw bolts 129 and 130 may thus be backed out until there is a suitable clearance between the guide member 123 and the standard 33, and the tilt or parallelism of the guide member 123 with the indicator bar 121 may be adjusted by driving the screws 141, 142 inward to engage the standard 33.

The screws 129, 130 bind the guide member 123 to the standard, while screws 141, 142 press the guide member 123 outward from the standard. Between the adjustment of these two pairs of screws, the guide member 123 may be fixedly secured in such position on the standard that the indicator bar 121 will slide freely and will not bind in its groove 133.

The frame member 30 of the band saw is provided with a vertically extending body flange 145 (Fig. 2), which serves with the reinforcing flanges 61–64 to support a cylindrical bearing hub 65.

The bearing hub 65 is provided with a through bore 147, but adjacent each end it is cast with an inwardly extending rib 148, which may be counterbored at 149 to provide an accurately sized bore for receiving the two anti-friction bearing 150, 151. The outer races of these bearings have a tight frictional fit in the counterbores 149. The inner races of the bearings, which are supported by suitable balls in the outer races, have bores for passing the lower shaft 152. Shaft 152 is provided with a thrust bearing 153 at the right side of the anti-friction bearing 151, secured to the shaft by a set screw, and at its right end the shaft 152 fixedly supports the pulley 28, which is suitably keyed and secured to the shaft by a key and a set screw.

The other end of the shaft 152 carries the lower band saw pulley 155, which is also suitably keyed to the shaft 152, to rotate with the shaft. The end of the shaft is provided with a threaded bore 156 for receiving the flat headed screw bolt 157, which secures a partially spherical shield plate 158 to the shaft and pulley 155.

The shield plate has a countersunk, centrally located aperture 159 for engagement with the screw, so that the screw head is flush with the shield plate. The right side of the shield plate (Fig. 2), adjacent its outer edge, engages the face of the pulley 155 and insures the securement of the pulley 155 on the shaft 152.

The shield 158 also provides a smooth finished surface for the exposed center of the lower band saw pulley 155, so that there are no projecting bolts that might become engaged by the clothing of the user.

The lower band saw pulley 155 may comprise a cast metal member provided with an approximately cylindrical rim 160, and a radial body flange 161, joining the rim to a hub 162. The hub 162 has a bore 163 for receiving the shaft 152. The rim 160 is provided with a crowned surface 164, which may be covered by a continuous sheet rubber band 165 of complementary shape, adapted to give a better traction between the pulley and band saw 166, and to protect the sharp edges of the band saw from engagement with the metallic parts of the pulley.

The lower pulley 155 is preferably provided with a more pronounced crown than the upper pulley 167, in order that the lower pulley may keep its band saw 166 on the pulley in spite of pivotal adjustments of the axis of the upper pulley.

The band saw 166 comprises an endless steel band saw of conventional form and of suitable length so that it may be tightly mounted upon the pulleys 155, 167.

The standard 33 is provided with a laterally projecting arm 35 which overhangs the table 32. The arm 35 is adapted to support the upper band saw pulley 167, its bearings, and associated mechanism. For this purpose the laterally projecting arm 35 supports a cast metal guide fixture 170 (Fig. 9), which is provided at its lower end with a pair of attaching flanges 171.

The attaching flanges 171 are secured to the arm 35 by suitable screw bolts 172 (Fig. 10). The fixture 170 is provided with a dove-tail-shaped groove 173, the open side of which faces toward the upper band saw pulley 167 and is adapted to receive the dove-tail-shaped slider 174.

The slider 174 is substantially smaller than the dove-tailed groove so that an adjustment may be provided in the form of a metal strip 175 mounted between one side of the guide 174 and the wall of the dove-tailed groove 173.

The metal strip 175 has a conical socket 176, which receives the conical end of an adjustment screw 177. The adjustment screw 177 is adjustably mounted in a threaded bore 178 and is secured in place by lock nut 179. The adjustment screw 177 and strip 175 permit the dove-tailed slider 174 to be driven against the opposite side of the dove-tailed groove 173 to secure relatively tight sliding fit, so that there is no possibility of looseness or rattling.

Any wear which may occur can readily be taken up by means of the adjustment screw 177. The slider 174 has its beveled surfaces 180 formed on the rearwardly extending legs 181, carried by a flat body 182, so that the slider may be hollow at 183.

A rearwardly projecting lug 184 (Fig. 9) is carried by the slider and provided with a threaded bore 185 for receiving the threaded portion 186 of an adjustment rod 187. The adjustment rod 187 extends through suitable bores in the fixture 170, and is provided with a hand wheel 188 at the bottom for its rotation. The hand wheel 188 may engage an annular shoulder 189, and may be secured in place by a nut 190 on the threaded reduced portion 191.

At its upper end the fixture 170 is provided with a plate 192, having a bore 193 for passing the rod 187, which is of reduced section at this point. The plate 192 is secured to fixture 170 by suitable bolts 194, and one end of a compression spring 195 rests on the plate 192. The other end of compression spring 195 is seated in an inverted cup-shaped member 196, carried by the upper end of the rod 187 and secured in adjusted position by a pair of lock nuts 197.

The weight of the slider 182 and the parts which it supports is carried by the spring 195. The spring 195 also places a predetermined tension on the band saw 166, and this tension may be increased by rotating the hand wheel 188 in a counter clockwise direction in Fig. 9, to drive the slider 174 upward. The adjustment rod 187 then reacts downward on the spring 195.

Referring to Figs. 2 and 9, the slider 174 pivotally supports a shaft-supporting member 200 for the upper band saw pulley 167. The shaft-supporting member 200 comprises a cast metal member having a lower cylindrical body 201, which is provided with a bore 202, within which the hollow shaft 203 has a tight frictional fit.

The hub 201 is carried by a pair of side flanges 204, which are joined at the rear side by a flange 205, but are separated at the top to receive the forwardly projecting lug 206. The shaft-supporting member 200 is pivotally mounted on the lug 206, projecting from the slider 174, by means of a pin or bolt 207, and thus the shaft 203 is mounted for pivotal movement about the center of the bolt 207.

The shaft 203 is provided with a centrally located through bore 208 and with a threaded counterbore 209. A threaded rod 210 extends through the bore 208 and has its threaded end 211 threaded into the bore 209, and its extreme end 212 bears on the inner surface 213 of slider 174. At its outer end the rod 210 is provided with a knurled thumb wheel 214, and a partially spherical sheet metal shield 215 is engaged about the rod 210 and held against the end of the shaft 203 by a compression spring 216. Thus the shield may be mounted out of contact with the upper pulley 167, but in position to protect the hands of the operator during an adjustment from any projecting bolts or other parts carried by the wheel.

The shield is, of course, held against rotation, since it is mounted on the fixed shaft 203. The rod 210 may be provided with a spherical end so that there is an engagement between the rod 210 and surface 213 only at the center or axis of the rod.

The upper pulley 167 comprises a cylindrical hub member 217, a radial flange 218, and a rim 219. The rim is provided with a crowned surface 220 and covered with a resilient band of rubber 221 for engaging the saw blade 166. The upper pulley is similar in shape to the lower one except for the amount of crown on the pulley and the structure of the pulley at the hub 217.

The hub 217 is provided with a centrally located bore 222, and the bore contains near its inner end an inwardly projecting flange 223 adapted to engage the outer race of an anti-friction bearing 224. This race has a frictional fit in a bore 225, and the shaft 203 may have a cylindrical enlargement 226 for engaging the inner race of the anti-friction bearing 224.

The bearing may be provided with a suitable oil seal 227, and a felt washer 228 may be interposed between the end of the hub 201 and the bearing 224. At its front end the hub 217 is provided with a similar counterbore 230 and an inwardly extending flange 231, and the shaft 203 has a reduced cylindrical portion 232, these three parts engaging the anti-friction bearing 233 in the same manner as described for the rear bearing 224.

A nut 234 and washer 235 secure the inner race of bearing 233 on the shaft 203 by means of a threaded portion 236. An annular retaining plate 237 is secured by screw bolts 238 to the hub 217 of the pulley 167, and the plate 237 overhangs the outer race of the bearing 233 to retain it in the bore 239. Bolts 238, plate 237, and nut 234 are all concealed by shield 215, but are not engaged by the shield, as they are carried by the rotating pulley 167.

By means of the rotation of the knurled thumb wheel 214 and rod 210, the tilt of the upper pulley 167 may be changed at any time, and particularly when the machine is in operation, without going to the back of the machine, and without danger to the operator. It is important, when backing work off such a band saw blade, that provision be made for causing the blade to engage its guide rollers tightly, as the lateral thrust on the saw band may otherwise cause the saw band to run off one or the other pulley.

For this purpose the operator may tilt the upper pulley 167 toward the right, at the top, by securing thumb wheel 214 in a clockwise direction, when it is desired to back off a work piece from the saw band. This adjustment may, of course, be made from the front of the machine, with the present structure.

This is a marked advantage over the devices of the prior art, in which it was necessary to go to the back of the machine to effect any such adjustment.

The band saw 166 is mounted on the pulleys 155, 167 and housed within the cover 39, 40, 41. It is guided above the table 32 by guides which are carried by a depending frame member 240 (Fig. 3), having a rotatably mounted grooved roller 242 carried by a bolt 243 passing through lug 244.

Metal blocks 245, slidably mounted in guides 246 and secured by set screws 247, are located on the opposite sides of the blade, with a suitable clearance.

A set of guide blocks, similar to blocks 245, above the table, is provided at 248 below the table, (Fig. 5) and another grooved roller 249 is located below the table. Both these guide members are carried by adjustably mounted shanks 250, 251, and the roller 249 is tilted diagonally in a direction opposite to the diagonal tilt of the roller 242.

The shape of the roller is such that there is practically a continuous contact engagement between the walls of the groove of the roller and the rear edge of the saw blade 166. Ordinarily the operation of the band saw will be apparent from the description of its parts.

When it is desired to back work off the saw blade, the operator, who usually stands in front of that part of the machine shown in Fig. 1, may adjust the tilt of the upper pulley by turning on the knurled thumb wheel 214. A right hand turn on this thumb wheel will cause the adjustment rod 210 to move the fixed shaft 203 toward the left, as the end 212 of the rod is fixed against axial movement.

This causes the upper part of the rim 219 of the pulley 167 to tilt backward, or toward the right, in Fig. 9, and the crown of that pulley tends to keep the band saw in the middle of the pulley while the band saw is operating. This causes the band saw to engage tightly against its rear guides and causes the band saw to resist any tendency of forward movement of the band saw, due to the friction of the work on the sides of the saw as the work is withdrawn.

This may be accomplished when the machine is still or when it is operating, and the guard structure at the upper pulley protects the hand of the operator while he is effecting an adjustment of the pulley tilt.

The adjusting means is effective at the axis of the pulley by means of the stationary hollow pulley shaft. The table of my band saw is provided with an angularity indicator, mounted on the standard, which is visible to the operator at all times, and indicates at all times the angularity of the table top. This indicator structure is provided with a guide which is capable of such adjustment that there is no possibility of binding of the indicator in its guide.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In a band saw tool-supporting structure, comprising a frame member, a slider engaged in a complementary groove in said frame member, threaded means located in a threaded bore in said slider and extending in a direction to adjust the tension of a band saw, said threaded means being supported by a compression spring engaging said frame member, a hollow shaft pivotally mounted on said slider, said hollow shaft rotatably supporting a band saw pulley, and a threaded adjustment rod mounted in a threaded bore in said shaft and engaging said slider, said rod projecting from the forward end of said shaft whereby the angularity of tilt of the pulley may be adjusted from the front of the machine.

2. In a band saw tool-supporting structure, comprising a frame member, a slider engaged in a complementary groove in said frame member, threaded means located in a threaded bore in said slider and extending in a direction to adjust the tension of a band saw, said threaded means being supported by a compression spring engaging said frame member, a hollow shaft pivotally mounted on said slider, said hollow shaft rotatably supporting a band saw pulley, and a threaded adjustment rod mounted in a threaded bore in said shaft and engaging said slider, said rod projecting from the forward end of said shaft whereby the angularity of tilt of the pulley may be adjusted from the front of the machine, said shaft having anti-friction bearings interposed between said shaft and pulley and said shaft projecting from said pulley, and a shield located on said rod and engaging the end of said shaft for guarding the hand of an operator from rotating parts on said pulley, said rod having a head and compression spring means between said head and said shield for holding said shield in predetermined position, engaging said shaft and having a clearance with said pulley.

3. In a band saw the combination of a supporting frame with upper and lower band saw pulleys, a band saw carried by said pulleys, pulley shafts for said upper and lower pulleys carried by said frame, one of said pulley shafts being hollow, means for supporting said latter pulley shaft pivotally upon said frame at a pivot point spaced from the axis of said latter shaft, and a threaded means mounted in said hollow shaft and having threaded engagement therewith and projecting from both ends of said hollow shaft, said threaded means engaging a part carried by said frame substantially at the axis of said hollow shaft whereby the pulley carried by said hollow shaft may have the direction of its axis adjusted during the operation of the machine to maintain the band saw on said pulleys under predetermined conditions.

4. In a band saw the combination of a supporting frame with upper and lower band saw pulleys, a band saw carried by said pulleys, pulley shafts for said upper and lower pulleys carried by said frame, one of said pulley shafts being hollow, means for supporting said latter pulley shaft pivotally upon said frame at a pivot point spaced from the axis of said latter shaft, and a threaded means mounted in said hollow shaft and having threaded engagement therewith and projecting from both ends of said hollow shaft, said threaded means engaging a part carried by said frame substantially at the axis of said hollow shaft whereby the pulley carried by said hollow shaft may have the direction of its axis adjusted during the operation of the machine to maintain the band saw on said pulleys under predetermined conditions, and manual means carried by the ends of said threaded means opposite to its engagement with the frame for engagement with the hand in adjusting the tilt of the hollow pulley shaft.

5. In a band saw the combination of a supporting frame with upper and lower band saw pulleys, a band saw carried by said pulleys, pulley shafts for said upper and lower pulleys carried by said frame, one of said pulley shafts being hollow, means for supporting said latter pulley shaft pivotally upon said frame at a pivot point spaced from the axis of said latter shaft, and a threaded means mounted in said hollow shaft and having threaded engagement therewith and projecting from both ends of said hollow shaft, said threaded means engaging a part carried by said frame substantially at the axis of said hollow shaft whereby the pulley carried by said hollow shaft may have the direction of its axis adjusted during the operation of the machine to maintain the band saw on said pulleys under predetermined conditions, said threaded means having a shield mounted thereon engaging the end of said hollow shaft, said shield having a clearance with the pulley carried by said hollow shaft, and resilient means engaging the shoulder on said threaded means engaging said shield to hold the shield in predetermined position.

6. An arrangement for adjustably supporting the pulley of a band saw at predetermined tilt and band saw tension comprising a support, a threaded member carried by said support and rotatably mounted thereon, manual means carried by said threaded member for its rotation, resilient means engaging said support and engaging a shoulder carried by said threaded member for supporting the threaded member and placing a predetermined tension on the band saw, a slider carried by the support having a threaded bore engaging said threaded member, a shaft supporting lever pivotally mounted on said slider and having a bore for supporting a shaft adjacent said slider, a hollow shaft carried by said lever for supporting a band saw pulley, and a threaded member threadedly mounted inside said hollow shaft and having one end engaging said slider, said threaded member projecting from the other end of said hollow shaft whereby the tilt of the pulley may be adjusted and the position of the slider may be adjusted while the machine is operating.

7. In a mechanism for adjusting the position of a band saw pulley, the combination of a support with a lever pivotally carried by said support depending therefrom, said lever having a transverse bore, a hollow shaft fixedly secured in said bore, said shaft having a threaded bore, a threaded rod in said shaft threadedly engaging said latter bore, said rod projecting from said shaft at each end, manual means carried by the outer end of said rod opposite to said pivoted lever, and a band saw pulley rotatably mounted on said shaft whereby the angular position of the shaft and pulley may be adjusted by said threaded means while the pulley is rotating.

8. In a mechanism for adjusting the position of a band saw pulley, the combination of a support with a lever pivotally carried by said support depending therefrom, said lever having a transverse bore, a hollow shaft fixedly secured in said bore, said shaft having a threaded bore, a threaded rod in said shaft threadedly engaging said latter bore, said rod projecting from said shaft at each end, manual means carried by the outer end of said rod opposite to said pivoted lever, and a band saw pulley rotatably mounted on said shaft whereby the angular position of the shaft and pulley may be adjusted by said threaded means while the pulley is rotating, a metal shield carried by said rod and engaging the outer end of said shaft, and compression spring means between said shield and said manual means for holding said shield in predetermined position on said rod, said shield having a clearance with respect to said pulley.

THERON L. HEDGPETH.